Figure 1:
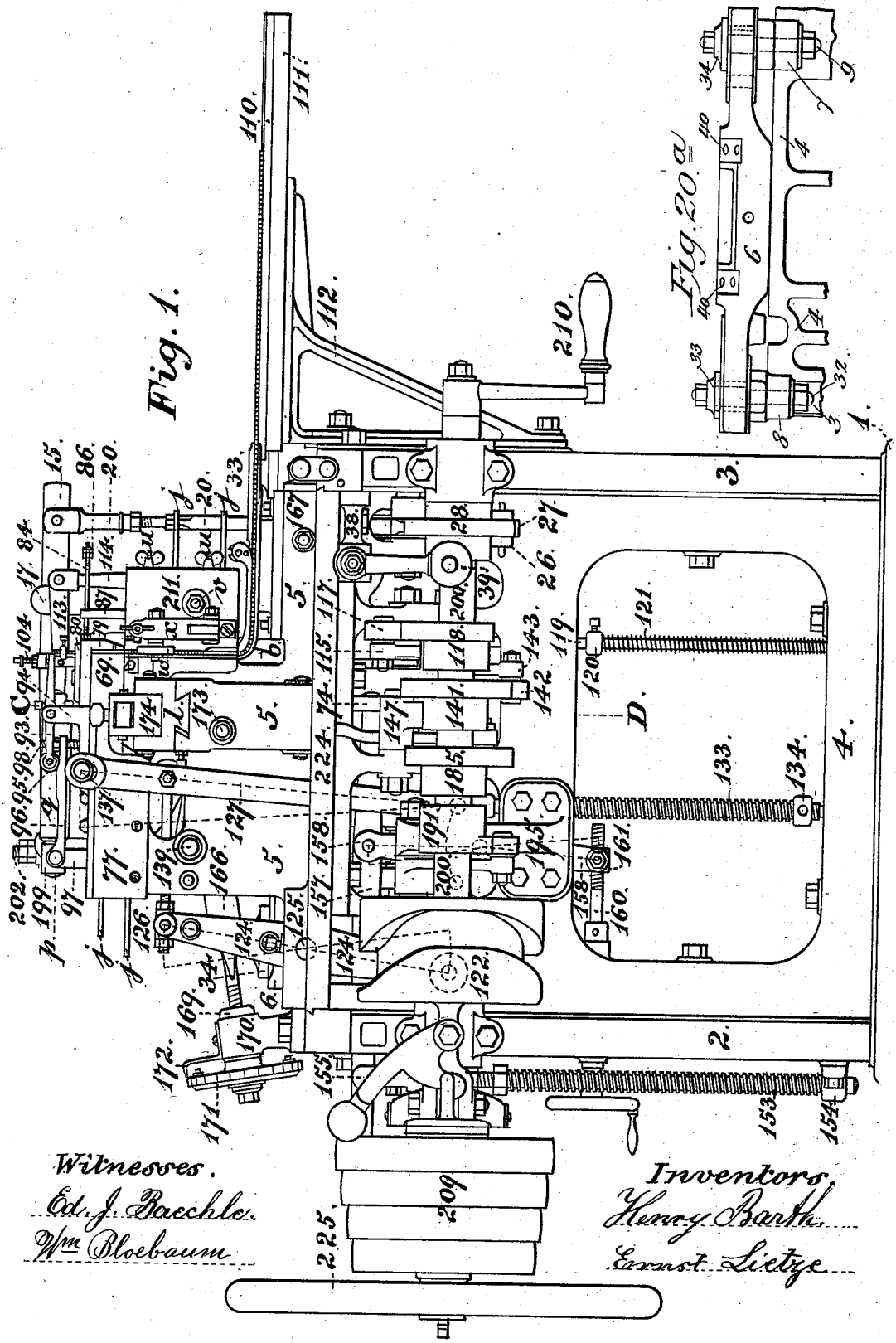

(No Model.)  9 Sheets—Sheet 1.

H. BARTH & E. LIETZE.
TYPE CASTING AND FINISHING MACHINE.

No. 376,765. Patented Jan. 24, 1888.

Witnesses.
Ed. J. Baechle.
Wm Bloebaum

Inventors,
Henry Barth
Ernst Lietze (No Model.)

H. BARTH & E. LIETZE.
TYPE CASTING AND FINISHING MACHINE.

No. 376,765. Patented Jan. 24, 1888.

9 Sheets—Sheet 2.

Witnesses
Ed. J. Baechle
Wm. Bloebaum

Inventors
Henry Barth
Ernst Lietze (No Model.) 9 Sheets—Sheet 3.
H. BARTH & E. LIETZE.
TYPE CASTING AND FINISHING MACHINE.
No. 376,765. Patented Jan. 24, 1888.
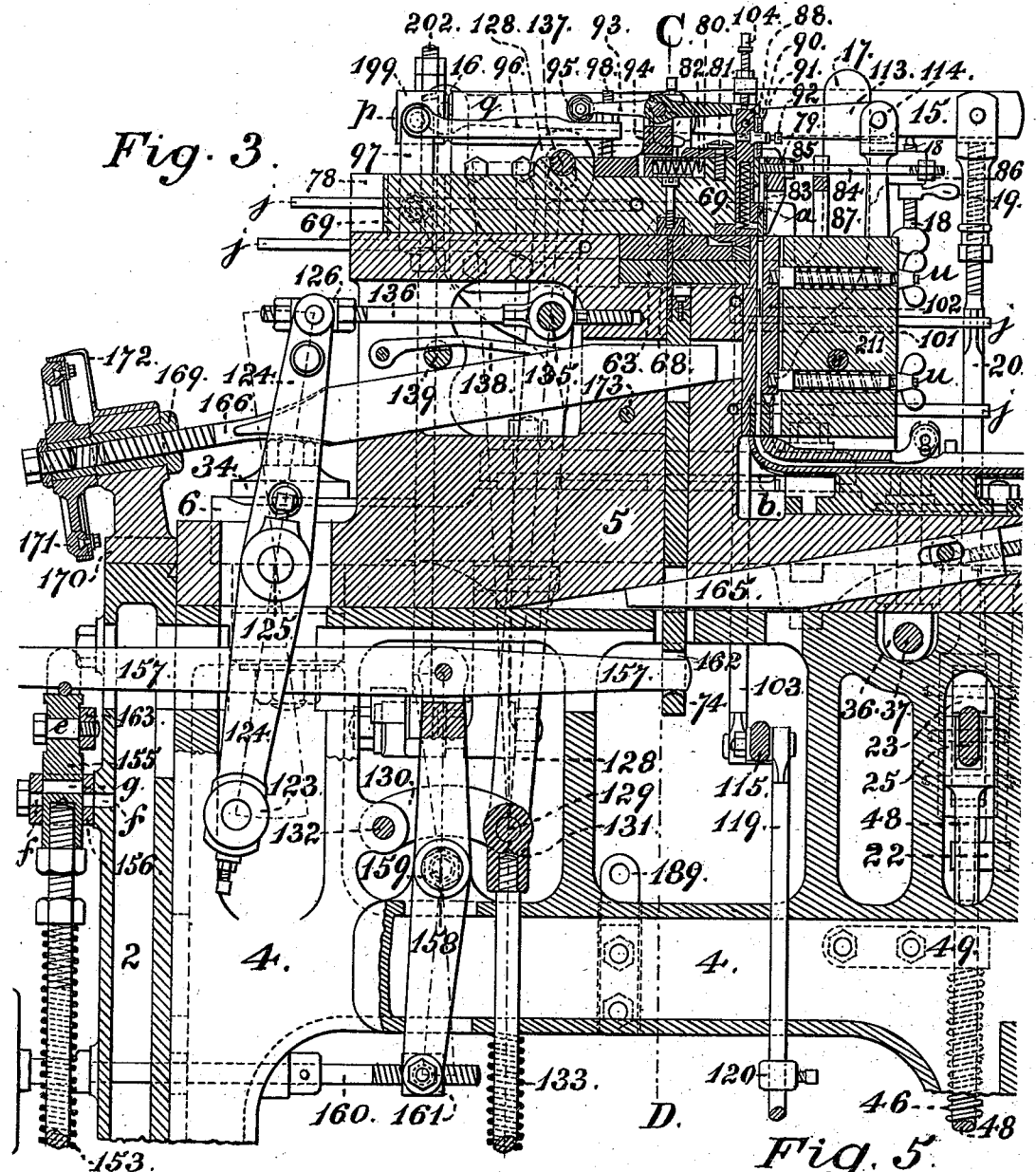
Fig. 3.
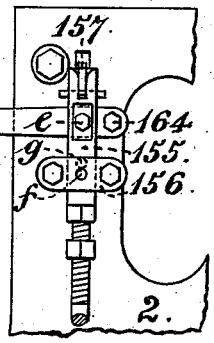
Fig. 4.
Fig. 5.
Witnesses.
Ed. J. Baechle
Wm. Bloebaum
Inventors.
Henry Barth
Ernst Lietze

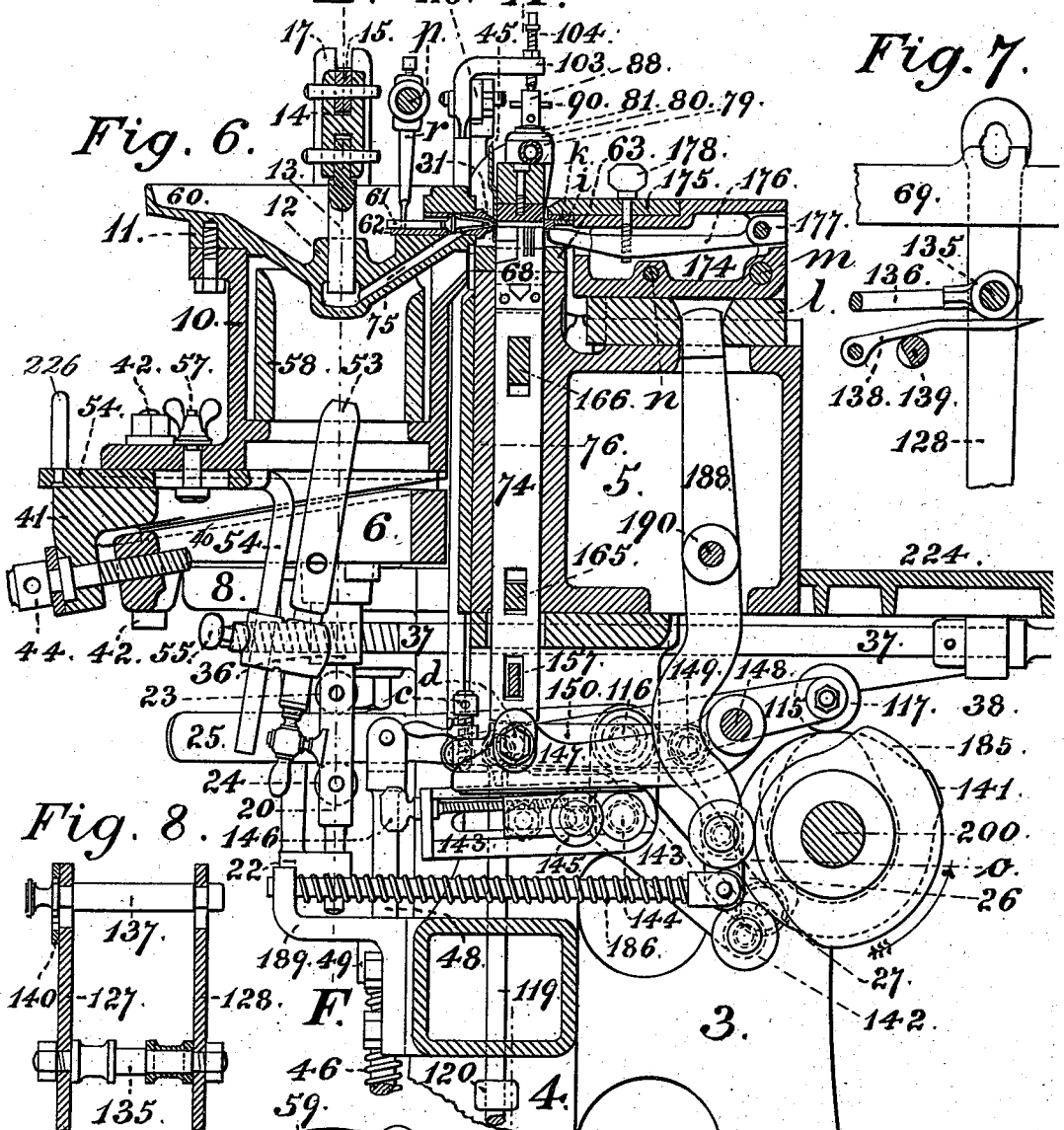

(No Model.) 9 Sheets—Sheet 5.
H. BARTH & E. LIETZE.
TYPE CASTING AND FINISHING MACHINE.

No. 376,765. Patented Jan. 24, 1888.

Witnesses.
Ed. J. Bacchle
Wm Bloebaum

Inventors.
Henry Barth
Ernst Lietze

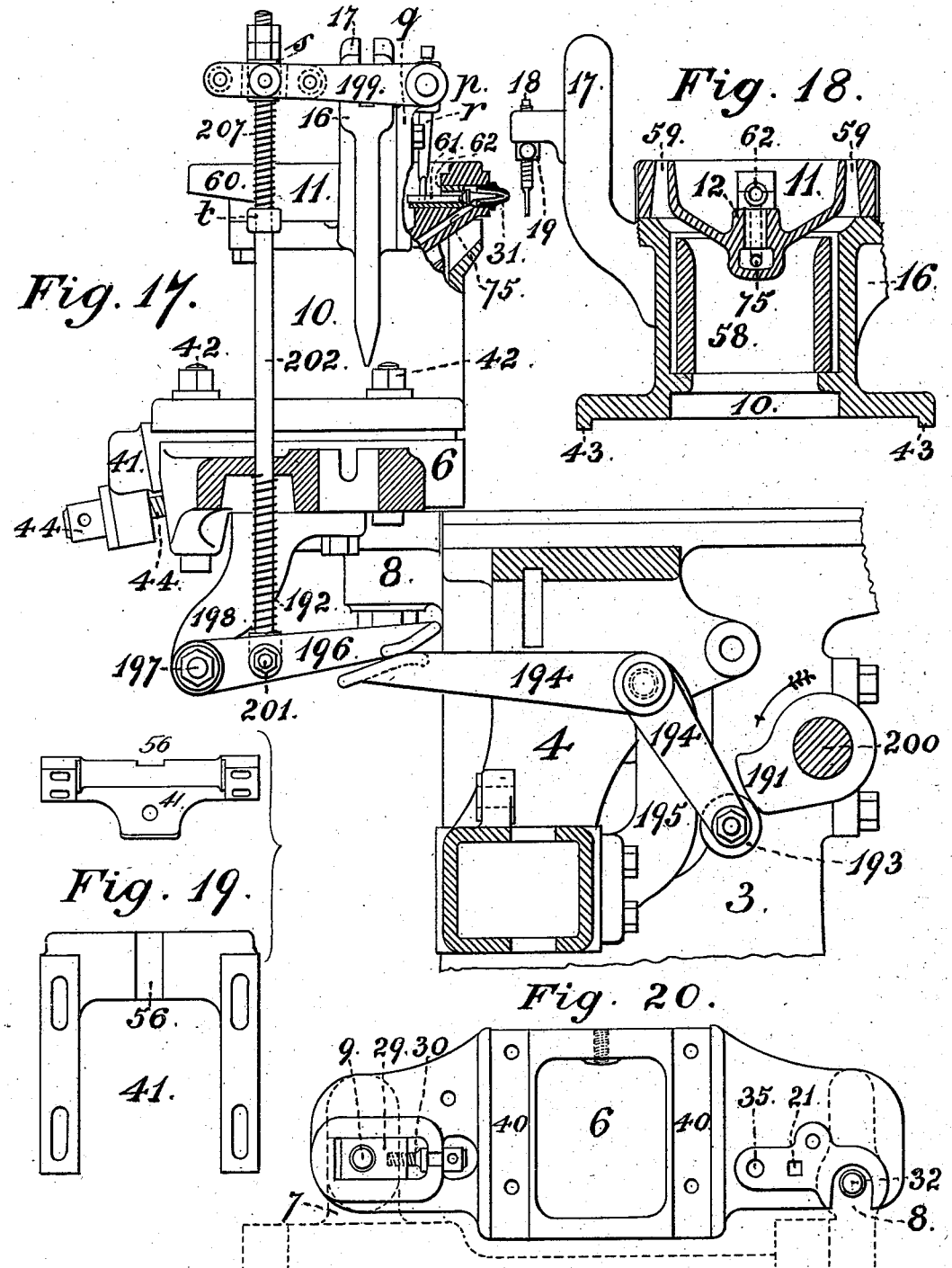

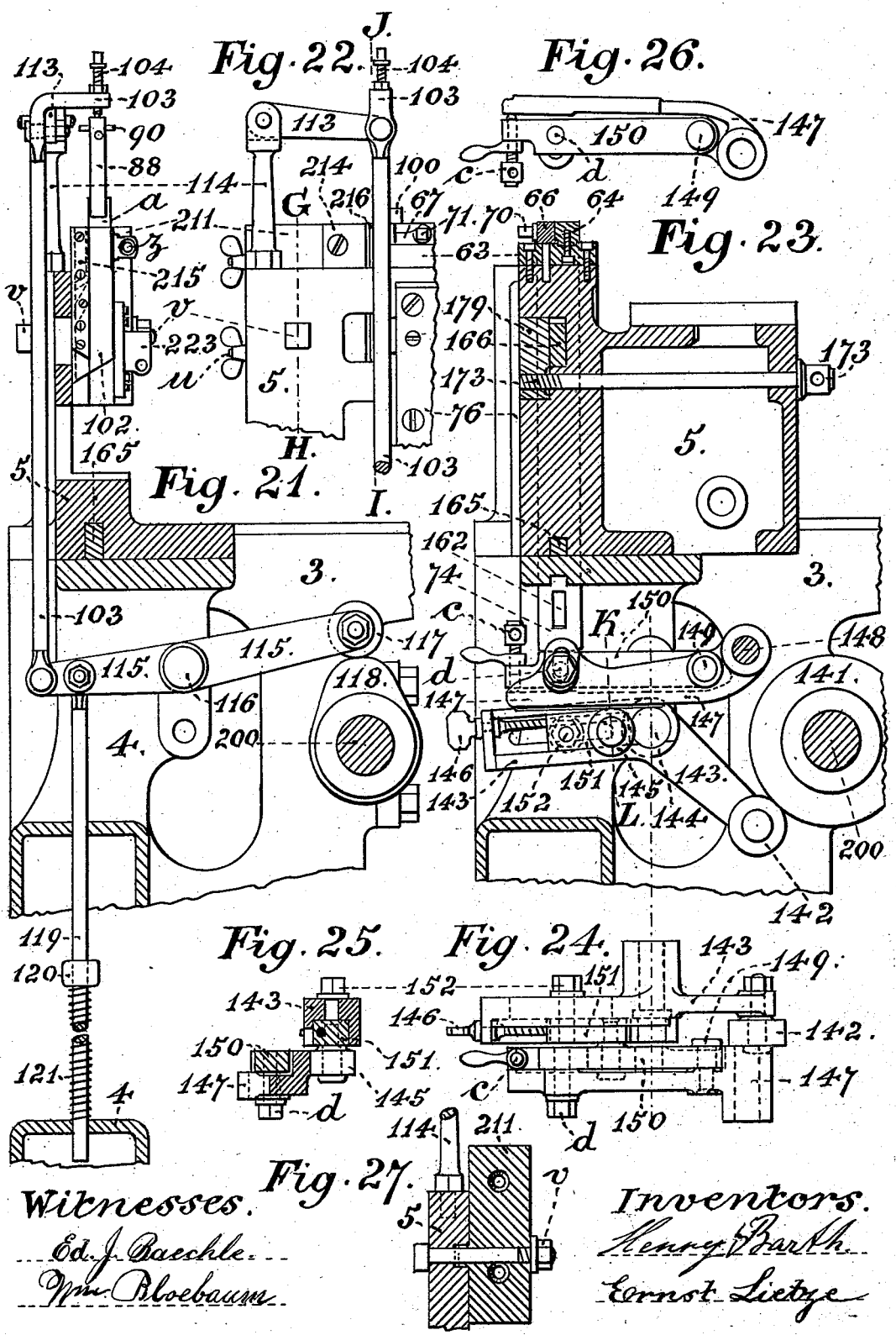

(No Model.) 9 Sheets—Sheet 8.
H. BARTH & E. LIETZE.
TYPE CASTING AND FINISHING MACHINE.
No. 376,765. Patented Jan. 24, 1888.
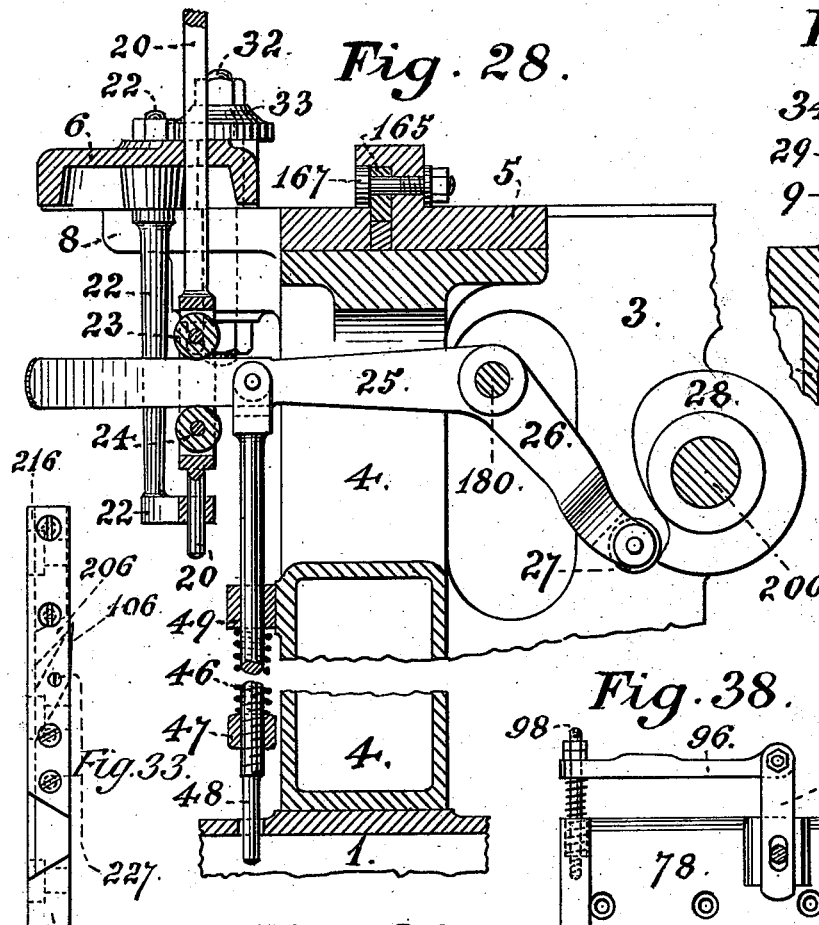
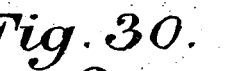
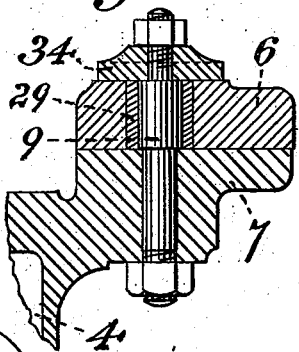
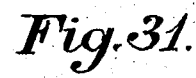
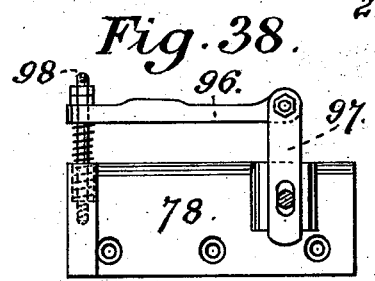
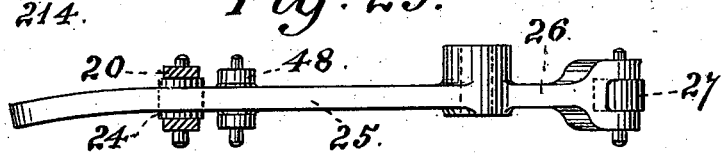
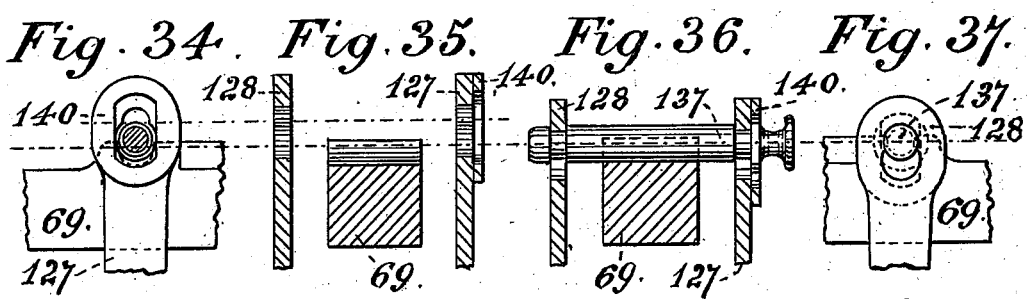
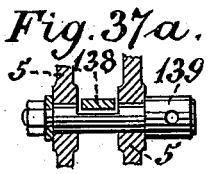
Witnesses.
Ed. J. Baechle
Wm. Bloebaum
Inventors.
Henry Barth
Ernst Lietze
N. PETERS, Photo-Lithographer, Washington, D. C.

(No Model.) 9 Sheets—Sheet 9.
H. BARTH & E. LIETZE.
TYPE CASTING AND FINISHING MACHINE.
No. 376,765. Patented Jan. 24, 1888.
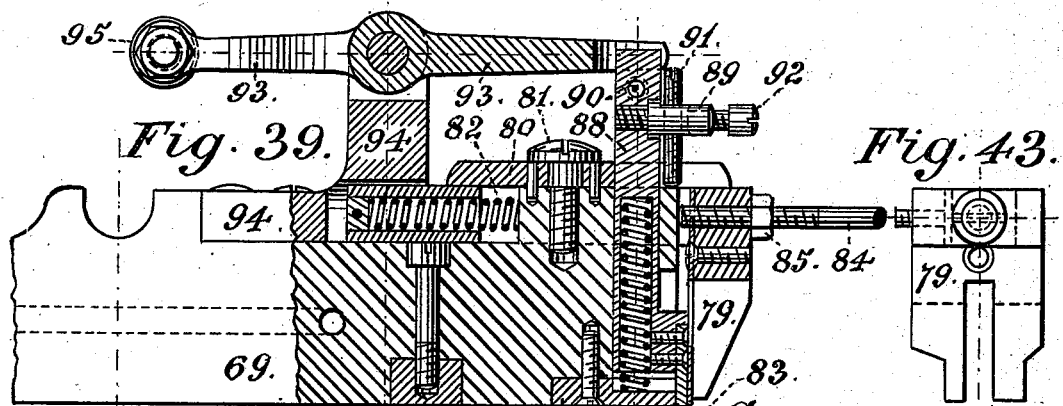
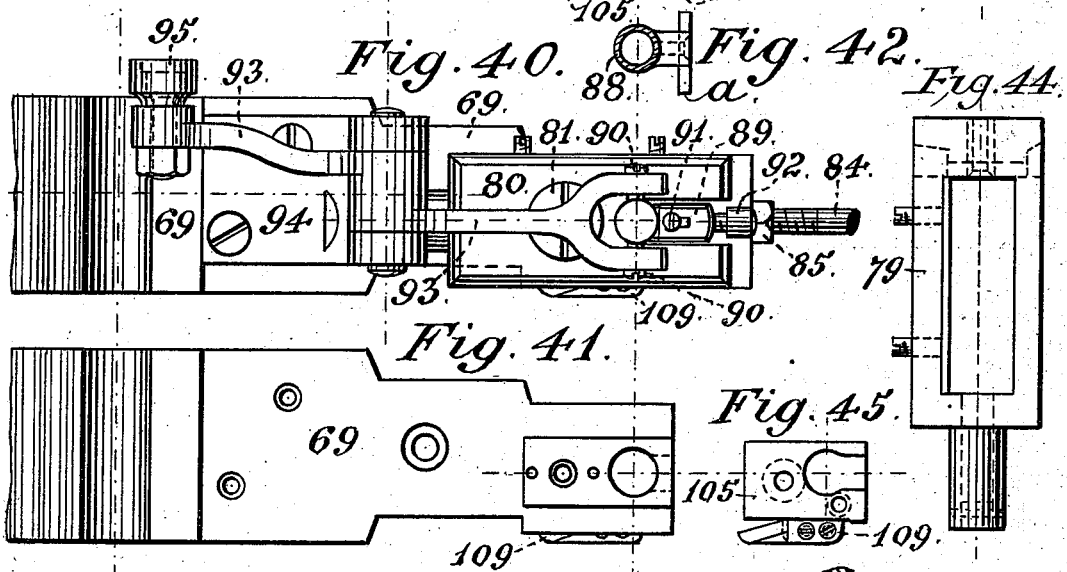
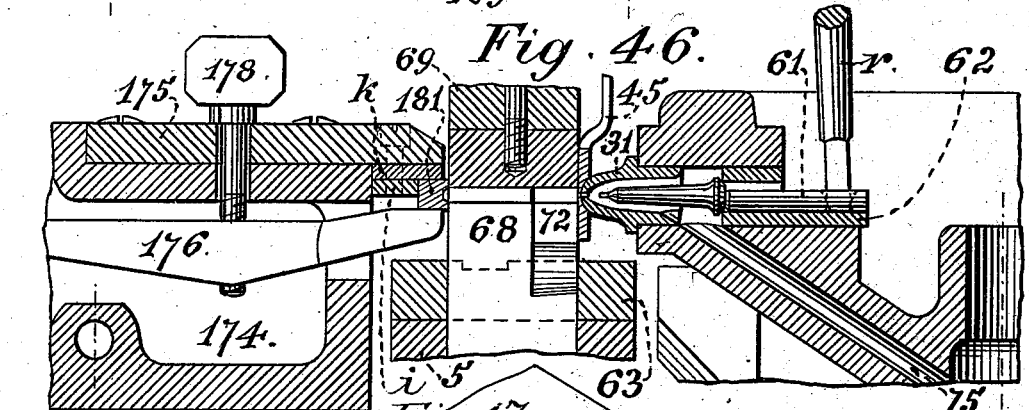
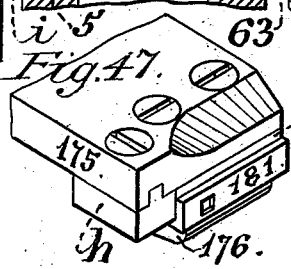
Witnesses.
Ed. J. Baeckle
Wm. Rlorbaum
Inventors.
Henry Barth
Ernst Lietze

UNITED STATES PATENT OFFICE.

HENRY BARTH AND ERNST LIETZE, OF CINCINNATI, OHIO; SAID LIETZE ASSIGNOR TO THE CINCINNATI TYPE FOUNDRY, OF SAME PLACE.

TYPE CASTING AND FINISHING MACHINE.

SPECIFICATION forming part of Letters Patent No. 376,765, dated January 24, 1888.

Application filed June 12, 1886. Serial No. 205,010. (No model.)

*To all whom it may concern:*

Be it known that we, HENRY BARTH and ERNST LIETZE, both citizens of the United States, and both residing at the city of Cincinnati, in the county of Hamilton and State of Ohio, have invented a new and useful Type Casting and Finishing Machine, of which the following is a specification.

Our invention relates to improvements in machines in which types are cast, separated from the jets, rubbed, grooved, dressed, and set on sticks, and especially to that class of type-casting machines in which the mold is stationary, save the sliding cover and the body-piece of the latter, and in which the metal-kettle is movable and adjustable in regard to its position relatively to the mold.

The objects of our improvements are:

First, to provide a mold that will retain its proper size and form, and that will not be altered by unequal expansion of its parts when exposed to the heat of the liquid metal.

Second, to afford facilities for the correct and convenient adjustment of the body-piece of the mold in respect to its highest and lowest position and in respect to its motion.

Third, to design and construct an effective grooving and dressing apparatus.

Fourth, to design and apply reliable, simple, and durable mechanical movements for the various operations.

Fifth, to arrange all working pieces in such a manner that they are easily accessible, and form and compose the frames so as to make such an arrangement possible.

Sixth, to increase the caloric efficiency of the furnace and metal-kettle.

Seventh, to apply and adapt a mechanically and positively operated valve for the metal-pump to the class of type-casting machines in which the mold is stationary and the furnace, metal-pot, and pump are movable and adjustable. Such valves, called the "choker," are used to a great extent in the United States in that class of machines in which the furnace, metal-pot, and pump are stationary and the mold is movable and adjustable; and the object of this part of our invention required to devise a motion that makes the adaptation of the choker to this class of machines possible.

Eighth, to provide a matrix-holding device which admits to make use and take advantage of a point in which the American system of manufacturing types differs from the European—namely, in most American type-foundries it is customary to fit matrices with accurate side and head bearings, and to secure in this way, once for all, the correct position of the face of the types in relation to the body of the same, while in Europe the method prevails to adjust the matrix by moving the same in or with the matrix-holder until the correct position is obtained. The matrix-holder of all automatic type casting and finishing machines in which the mold is stationary and the furnace and metal-pot are movable, and which are mostly of European origin, were heretofore calculated for matrices not fitted with side and head bearings; and our object is to afford a matrix-holder in which we can use our numerous old adjusted matrices to advantage.

Ninth, to arrange the various operations and the means which effect the same in order and position, that types may be taken out for examination and inspection at any place or at any state of their development.

We attain these objects by the mechanisms illustrated in the accompanying drawings, in which—

Figure 2:
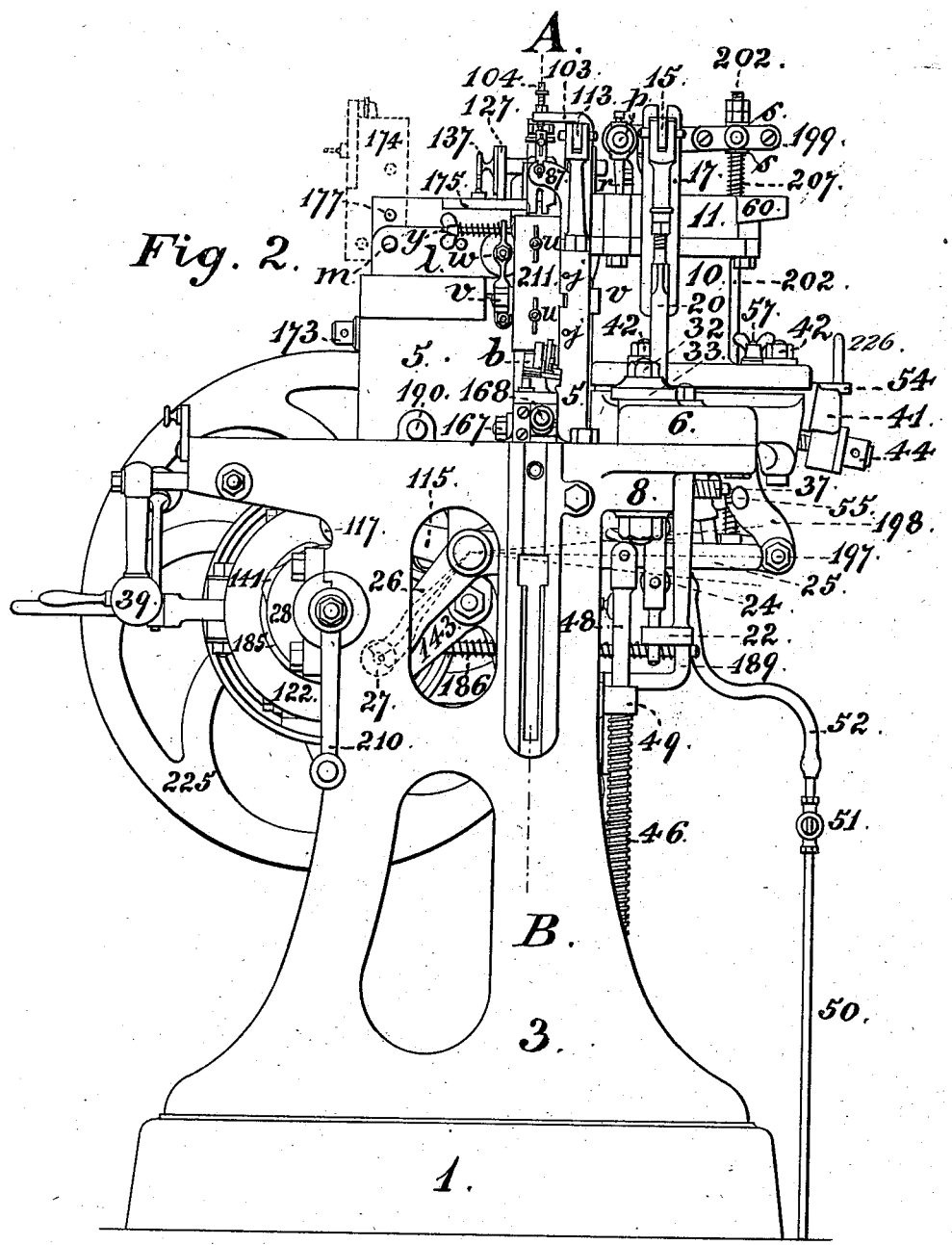
Figure 15:
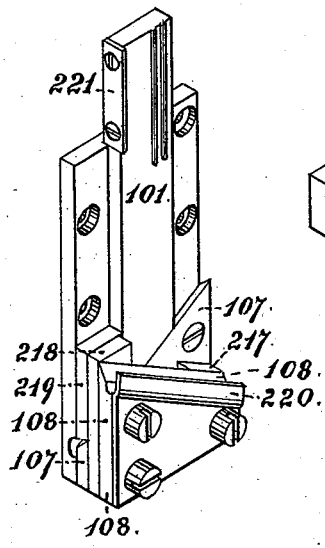
Figure 12:
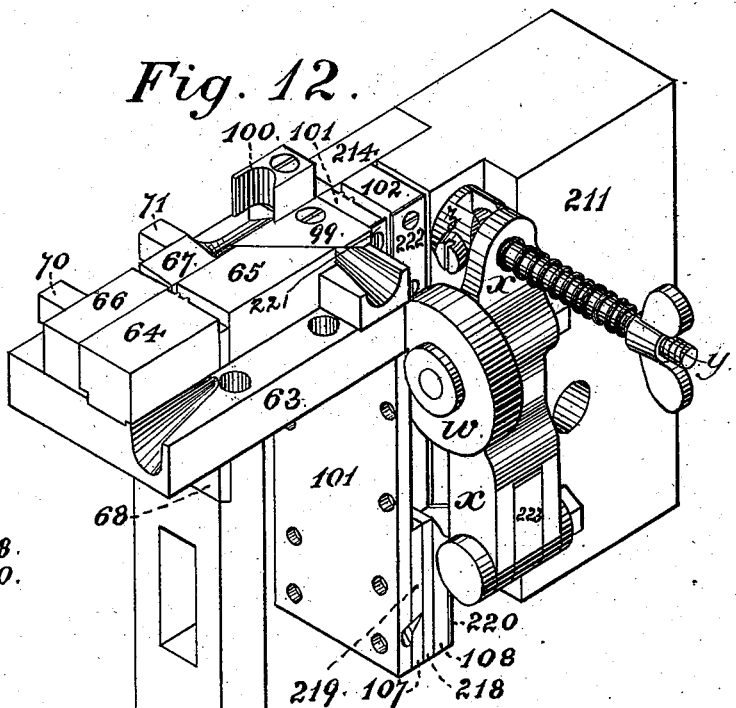
Figures 13, 14:
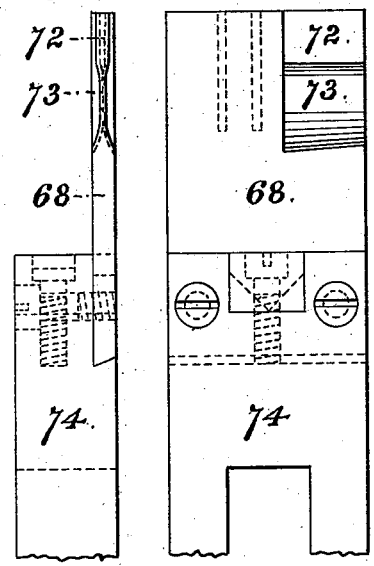
Figure 16:
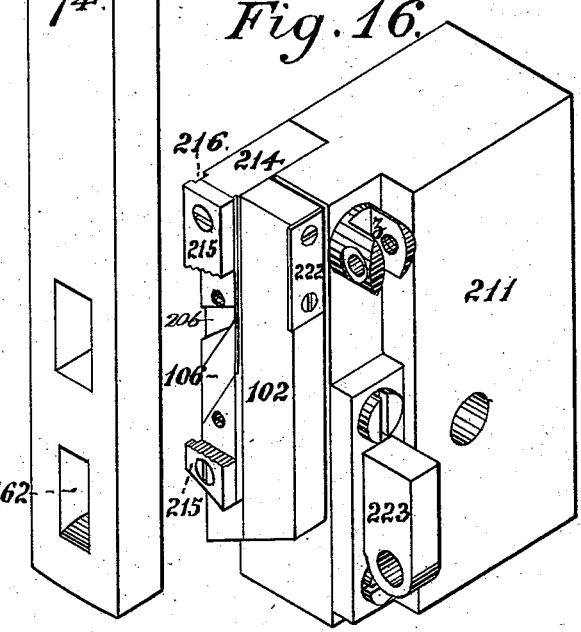

Figure 1 represents a front elevation of the entire machine, a part of the bed-plate being cut off by the marginal line; Fig. 2, an end elevation, in which the bracket and table for the setting-sticks are omitted. Fig. 3 is a longitudinal section of a part of the machine through the center of the mold about the line A B, Figs. 2 and 6; Fig. 4, a detail view showing the arrangement for disengaging the spring of the slide to which the body-piece of the mold is attached; Fig. 5, a sectional detail view showing the end of the wedge and the screw for adjusting the highest position of the body-piece of the mold; Fig. 6, a cross-section of a part of the machine at the line C D, Figs. 1 and 3. A few pieces, however, which are partly cut by this line and a few pieces which lie before the plane of the cut are drawn in full. Figs. 7 and 8 are detail views of the side arms operating the mold-covering slide. In Fig. 7 the rear arm is shown in its elevated position, ready to receive the pin that operates the slide, also the lifter and cam for elevating the side arms. In Fig. 8 this pin is shown in its place, also the pin to which the connecting-rod of the motion of the mold-covering slide is to be attached. Fig. 9 is a top view of the metal-kettle and pump-barrel; Fig. 10, a top view, and Fig. 11 an end view, of the matrix-vise. Fig. 12 is an isometric view of the type-mold of the slide, to which the body-piece of the mold is attached, and of the grooving and dressing apparatus. Fig. 13 is a back view, and Fig. 14 a side view, of the body-piece of the mold and the upper end of the slide, to which it is fastened. Figs. 15 and 16 are isometric views of parts of the grooving and dressing apparatus. Fig. 17 illustrates the choker mechanism. Fig. 18 is a vertical central section of the furnace and the metal-kettle at the line E F, Fig. 6; Fig. 19, a top and an end view of the wedge for raising and lowering the furnace and kettle; Fig. 20, a top view, and Fig. 20ᵃ a back view, of the swinging base-plate of furnace and kettle. Figs. 21 and 22 illustrate the mechanism by means of which the types are pushed through the grooving and dressing apparatus. In Fig. 21 the mold-beam 5 is shown in section at the line I J, Fig. 22. The parts of the mechanism, however, which are partly cut by this line and which lie partly before and partly behind the plane of the cut are drawn in full. Fig. 22 is a rear elevation of a part of the mold-beam 5, with the details attached to this part, and it shows how the rod 103 is suspended by the link 113. Fig. 23 illustrates the means for moving the body-piece of the mold, the manner in which the wedge 166 is secured in position when adjusted, and shows how the mold is held in its place. Fig. 24 is a top view, and Fig. 25 a section at the line L K, Fig. 23, of the lever 143 and of the arms 147 and 150 of the motion of the body-piece of the mold; Fig. 26, a detail view of the arm 147, with the secondary arm 150 of the device for operating the body-piece of the mold from the side opposite that in which it is seen in Fig. 23; Fig. 27, a sectional detail view showing the bolt $v$ securing the block 211 of the grooving and dressing apparatus to the mold-beam 5. Fig. 28 illustrates the lower part of the pump-moving mechanism, showing, also, the bolt 167, by means of which the wedge 165 is secured in position when adjusted. Fig. 29 is a detail view of the lower lever of the pump-moving mechanism. Fig. 30 shows the construction of the pivot 9 of the swinging base-plate of the furnace and the metal-pot. Figs. 31, 32, and 33 are respectively a front elevation, a cross-section, and a side elevation of the plate 214 and 215 of the grooving and dressing apparatus. Figs. 34, 35, 36, and 37 are detail views illustrating the construction of the upper ends of the side arms that operate the mold-covering slide, and also illustrating the construction of the pin that connects the side arms with the slide. Fig. 37ᵃ is a detail view of the cam 139 for elevating the side arms that operate the mold-covering slide; Fig. 38, a detail view showing the camway 96 and the manner in which it is attached to the guide-plate 78; Fig. 39, a sectional elevation, and Fig. 40 a top view, of a portion of the mold-covering slide, with all the smaller details attached to the same, on an enlarged scale; Fig. 41, a top view of a portion of the mold-covering slide, with only the plate 105 and the rubbing-knife 109 attached to the same, on an enlarged scale; Fig. 42, a sectional detail view of the piston 88, with the pushing-plate $a$ attached to it; Fig. 43, an end view, and Fig. 44 a top view, of the movable jaw 79 of the type-vise; Fig. 45, a detail view of the plate 105, with the rubbing-knife 109 attached to it; Fig. 46, a section of portions of the matrix-vise, the mold, and the metal-pot, at the line D C, (Figs. 1 and 3,) on a larger scale than that of Fig. 6; Fig. 47, an isometric view of the mouth of the matrix-vise, showing the method of securing the stool $h$, which serves as a head-bearing of the matrix.

Similar letters refer to similar parts throughout the several figures.

We will describe, first, the arrangement and operations of the whole machine, and then point out and describe our improvements.

The bed-plate 1, the standards 2 and 3, and the center support 4, upon which the mold-beam 5 is secured, constitute the frame-work of the machine. The plate 6 rests on brackets 7 and 8, which project backward from the right side frame, 3, and the center frame 4, respectively, and may be swung around the pivot 9, which is fastened to the bracket 7. The plate 6 serves as a base for the furnace 10. The metal-pot 11 and the pump-barrel 12 are cast in one piece and fastened to the furnace 10. The solid pump-plunger 13 is connected by means of the link 14 with the upper lever, 15, of the pump mechanism, which lever has its fulcrum at the projection 16. cast on the furnace. The similar projection, 17, at the other side of the furnace, serves as a guide for the lever 15, and is provided with a set-screw, 18, and jam nut 19. The screw 18 acts as a stop for the lever 15, and by means of the same the stroke of the pump-plunger may be regulated. To the lever 15, and near the end of the same, the rod 20 is hinged, passing through the square hole 21 in the swinging plate 6, Fig. 20, is guided at its lower end by the guide 22, Fig. 28, and provided with two rollers, 23 and 24, upon which the backward-directed arm 25 of the angular lower lever of the pump mechanism acts. The obliquely frontward-directed arm 26 of this lever is provided with a roller, 27, upon which the cam 28 operates in the usual manner. The cam 28, as well as other cams employed in the various movements, are fastened to the driving-shaft 200. The journal-boxes, in which the driving-shaft revolves, are applied to the side frames, 2 and 3. The rod 20 is composed of two parts, for the purpose of being adjustable in respect to its length. The lower part terminates at its upper end in a screw that fits in a nut with which the upper fork-shaped part is provided. This is an often-used arrangement, and does not require to be further described. The tail of the lever-arm 25, Fig. 29, is bent horizontally to a circle from the center of the pin 9, and the faces of the rollers 23 and 24 are a little wider than the face of the arm 25, to allow the plate 6, and with it the pump-rod 20, to be moved longitudinally in adjusting the nipple-hole to the center of the mold. While it is the object of the cam 28 to lift the pump-plunger 13, it is the duty of the spring 46, Figs. 2, 3, 6, and 28, to force down the same. This spring 46 presses against a nut on the spring rod 48, by means of which, also, its strength can be regulated, and finds its resistance at the guide 49 of the spring-rod, which guide is bolted to the center frame 4. The lower end of the spring-rod 48 is guided in the ground frame, 1, and the upper end terminates in a fork, and is hinged to the arm 25 of the lower lever of the pump mechanism.

The swinging base-plate 6, Fig. 20, of the furnace and kettle is not directly jointed with the pivot 9, but is provided with a rectangular hole, in which the block 29 is accurately fitted. This block is somewhat shorter than the rectangular opening in which it fits, has a round hole bored through to receive the pivot 9, and a tapped hole in which the screw 30 works. The screw 30 is journaled in the plate 6, and the head and a collar of the same prevent it from moving longitudinally, so that a turning of this screw will effect an adjustment of the discharge-opening in the nipple 31 of the pump in the direction of the length of the plate 6. The bracket 8, Figs. 2 and 20, that projects from the right side frame, 3, and that helps to support the plate 6, is provided with a pin, 32, similar to the pivot 9, and the plate 6 is prepared with a notch sufficiently large to straddle this pin. (See Fig. 20.) Both the pivot 9, Fig. 30, and the pin 32 are turned with shoulders corresponding with the thickness of the plate 6, and are mounted with large washers 33 and 34, secured by nuts, so as to allow the plate to work easily and without play between the faces of the brackets and the washers. In the hole 35 of the plate 6, Fig. 20, the swiveling-nut 36, Figs. 3 and 6, is applied, which receives the screw 37. The latter is supported by the bearing 38, Fig. 6, in which it fits a little loosely, so as to accommodate its direction according to the position of the nut 36, has two collars, one at each side of the bearing 38, to prevent longitudinal motion, and carries at its front end the handle 39, Figs. 1 and 2, for turning the same. The bearing 38 is firmly secured to the right side frame. A turning of the screw 37 will effect a motion of the base-plate 6 around the pivot 9, and consequently a withdrawing or an approaching of the nipple 31 from or to the mold. After the plate 6, and with it the parts which it supports, are removed so far that the nut 36 has become disengaged from the screw 37, the plate may be swung around by hand for about a quarter-turn, and all the working parts in the rear of the machine will become easily accessible for inspection, adjustment, cleaning, or repairing. In this case the right side of the plate 6 will leave the supporting-bracket 8; but the bracket 7, in combination with the pivot 9 and the washer 34, are constructed sufficiently strong to hold the plate with all the parts it carries.

During the general running of the machine the plate 6 requires only to be withdrawn a trifle in order to take out the apron 45, Figs. 6 and 46, for cleaning or heating, and to put it back in its place. The office of the apron is to secure a tight joint between the nipple and mold. Its back side forms, with the nipple, a ball-and-socket joint, while its plain front accommodates itself to the plain back of the mold. The swinging plate 6 is, furthermore, provided with two inclined planes, 40, Figs. 6, 20, and 20$^a$, for the wedge 41, Figs. 6 and 19, to slide on. The wedge 41 has the form of a fork, and is inserted between the swinging base-plate 6 and the bottom plate of the furnace 10. Four bolts, 42, passing through plate 6, wedge 41, and the bottom flange of furnace 10, serve to secure the furnace firmly to the base-plate. The bolts 42 fit accurately in base-plate 6 and in bottom plate of furnace, and, assisted by the ridges formed by the deepened inclined planes 40, Figs. 6 and 20$^a$, and by the ledges 43, Fig. 18, on the sole of the furnace, they permit no motion of the furnace, except a vertical one, and this only when the nuts of the bolts 42 are loosened. At the downward projection of the wedge 41, Figs. 6 and 19, the screw 44 is journaled in a manner so as to prevent it from moving longitudinally, and in the base plate 6 of the furnace a nut is tapped to receive this screw. The nuts of the bolts 42 42 42 42 having been loosened, turning this screw effects a sliding of the wedge and a raising or lowering of the furnace, and consequently a vertical adjustment of the nipple in respect to the mold.

As fuel for producing the heat to melt the metal illuminating gas is used. The gas-pipe 50, with the stop-cock 51, is indicated in Fig. 2; also the flexible india rubber hose 52, that connects the gas-conducting pipe 50 with the Bunsen (or similar) burner, 53, and into which a spiral spring (not visible in the drawings) is applied, to prevent collapsing. The object of the insertion of the flexible india-rubber pipe is to admit the base-plate 6 to be swung away without interfering with the gas-supply and without extinguishing the flame. The Bunsen (or similar) burner 53 is attached to the angular bracket 54, (see Fig. 6,) on which it may be slid up or down, to which it may be fastened at a suitable height by means of the set-screw 55, and with which it may be moved forward or backward in order to concentrate the heat at the center of the kettle or nearer to the nipple, as circumstances may require. The horizontal foot of the bracket 54 of the burner is guided by the groove 56, planed in the wedge 41, Fig. 19, and by the bottom surface of the sole of the furnace 10, and it may be fastened at a convenient position to the bottom flange of the furnace by means of the bolt and wing-nut 57, Fig. 6. The setting of the burner can be accomplished by the operator of the machine in a standing position by simply applying one hand to the handle 226 of the bracket and the other to the wing-nut 57.

The furnace 10 is lined with a hollow cylindrical reverberating fire-brick, 58, and the ascending air which did not enter the burner becomes heated in the incandescent tubular fire-brick, meets and unites with the flame in passing the annular opening left between the fire-brick and the bottom of the kettle. This secondary supply of hot air assists the combustion greatly, and a blue carbureted hydrogen flame surrounds the entire bottom of the kettle, passes through the circular openings 59, Figs. 9 and 18, around the kettle, under the nipple, under the projection 60, and unites above the kettle again to form a nearly complete cylinder. The purpose of the projection 60 of the metal-kettle is to receive the fresh charges of metal.

61, Figs. 6, 17, and 46, is the choker, a mechanically-moved double valve, the movement of which we will describe hereinafter. Its form is that of a body of revolution; but the cylindrical part by which it is guided in the sleeve 62 is flattened on top, so that a channel of segmental cross-section is left in the sleeve 62, through which the molten metal can flow from the space above to the space in the pump below the plunger. The choker is shown in the drawings in the position which it occupies during the time the pump-plunger is forced down, when its larger conical part acts as valve and the front of the sleeve 62 as valve-seat, and the communication between the spaces above and below the pump-plunger is choked off, and the metal is forced by the plunger through the passage 75, through the discharge-opening of the nipple 31, and through the hole in the apron into the mold. As soon as the mold is filled, the choker is moved forward, then the smaller conical part, near its front end, will act as a valve and find its seat in the nipple, and the discharge-opening in the latter will be closed. At the same time the point at the front end of the choker will press a minute amount of metal into the jet of the type just cast and so clear the discharge-opening. The length of the point of the choker is so adjusted as to come flush with and not project over the face of the apron.

The mold is composed of the heavy base-plate 63, Figs. 3, 6, and 12, side members or cheeks, 64 and 65, jet-pieces 66 and 67, body-piece 68, and the sliding cover 69, Figs. 3, 39, 40, and 41. The base-plate 63 is prepared with a rectangular hole for the body-piece to pass through and with a longitudinal groove, in which the tongues worked on the cheeks 64 and 65 accurately fit. The cheeks are secured to the base-plate by means of screws, Fig. 23, which are tapped from below in order to leave the upper faces of the cheeks smooth, the heads of the screws being countersunk at the bottom surface of the base-plate 63. The jet-pieces 66 and 67 are prepared with lips to fit in the groove formed by the base-plate 63 and by offsets worked on the side cheeks, 64 and 65, and are bolted to the members 64 and 65 by means of the tap-bolts 70 and 71. The outline of the body-piece 68 of the mold is a parallelopiped of accurately the same thickness as the body of the types to be cast and of a width equal to the height of the bodies of the types plus the length of their jets. It is provided with a groove or grooves similar to the nick or nicks of the type and corresponding with the projection or projections of the cheek 64, by which the nicks in the type are formed. It is milled out at the corner 72 to the shape of a wedge to fit accurately between the jet-pieces 66 and 67. Below the part 72 at 73 it is milled a little smaller, for convenience, sake, in fitting the jet part 72. It is, however, left as strong as possible at 73, so that this part helps to support and strengthen the part 72, and is fastened to the slide 74, which has the same width as the body-piece, in such a position that three side faces of the body-piece fall in the planes of three corresponding faces of the slide. This position, together with the plain prismatic outline of the body-piece of the mold, facilitates the correct fitting and adjusting of the various parts of the mold. For two reasons we prefer to make the wedge-shaped jet at that place where it joins the type comparatively very thin, viz: first, to break the force of the current of the metal and to prevent thereby an injury to the matrix; and, second, to reduce the resistance of the jets in being removed. The part 72 of the body-piece, being so thin, makes the support 73 so much more important.

The stationary parts of the mold are screwed to the mold-beam 5. The slide 74 of the body-piece of the mold is guided in a groove that is planed in the mold-beam from the back and that is closed by the cap 76, Figs. 6, 22, and 23. The sliding cover 69 of the mold moves on the top surface of the mold-beam, which is level with the top face of the stationary parts of the mold, and is guided by the two plates 77 and 78, Figs. 1 and 3, they being screwed to the sides of the mold-beam. The movements of the two slides 69 and 74 will be described hereinafter.

While the pump is forcing the metal into the mold, the covering-slide 69 stops at its extreme right position, in which it is shown in Figs. 1 and 3, and closes the mold on top. The matrix shuts the latter in front, and the body-piece 68 is held firmly and accurately at such a height that the depth of the space left in the mold, and in which the type is formed, is equal to the required thickness of the type runningwise. After the type is cast and sufficiently cooled off the matrix is withdrawn. Then the sliding cover 69 is moved to its extreme left position and stopped there. While moving toward the left a knife, 109, which is fastened to the plate 105 on the slide 69, (see Figs. 40, 41, and 45,) shaves off the burr which may form at the top of the type.

In Fig. 41 only a small projecting portion of the plate 105 and a small portion of the rubbing-knife 109 are visible. The rectangle at the right end of the slide 69 in Fig. 41 does not represent the plate 105, but a rectangular projection or raised part of the slide, against which the spring 82, Fig. 39, presses, and which serves as a guide for the frame-shaped jaw 79, Figs. 39, 43, and 44, of the type-vise.

In Fig. 45 the plate 105 and the rubbing-knife 109, attached to it, are shown separate, as if the same were moved from under the slide 69, Fig. 41, toward the right and parallel to the longitudinal center line of the slide.

To the slide 69 the angular jaw 79, Figs. 43 and 44, is attached, the horizontally-mortised part of which is guided laterally by a projection prepared for this purpose on the upper surface of the slide 69, and guided vertically between the slide 69 and the plate 80, the latter being secured to the slide 69 by means of the screw 81. The vertical part of the jaw 79 forms, with the end face of the slide 69, a parallel vise, and the spring 82 has the tendency to keep this vise closed. 83 is a flat spring fastened to the inner face of the vertical part of the jaw 79, for the purpose of making the grip of the vise a little elastic. The rod 84 is screwed in the jaw 79 and protected from getting loose by the jam-nut 85. At its right end it terminates in a screw, and carries two nuts, 86, Fig. 3. A little before the covering-slide 69 of the mold arrives at its extreme left position the first of the two nuts 86 touches the barrier 87, preventing the jaw 79 from moving farther with the slide 69, and causing the vise to be open when the slide is stopped at its extreme left position. The motion of the slide 69 and the nuts 86 being so adjusted that the open mouth of the vise will stop opposite the mold and will be ready to receive the type cast a little while before, then the slide 74, with the body-piece 68 of the mold, will be moved upward until the top face of the body-piece comes exactly even with the top faces of the cheeks 64 and 65, and will be held in this position. Then the slide 69 will be started to move toward the right, the nuts 86 leave the stop 87, and the vise closes and takes the type along.

The mold-covering slide is furthermore provided with a cylindrical hole near its right end, in which the piston 88 is fitted. (See Figs. 39 to 42.) The lower part of the hole is slotted through to the right end face of the slide 69, and at the lower end of the piston 88 a little feather is worked, that projects into the slot and prevents the piston from turning. A plate, $a$, a trifle thinner than the thickness of the bodies of the types and about as wide as the bodies are high is screwed to the feather on the piston and operates between the end face of the slide 69 and the flat spring 83 of the jaw 79. The piston 88 is partly hollow, and in its interior is placed a spring that rests on a small plate, 105, screwed to the bottom surface of the slide 69, and that has the tendency to push the piston up. Near its upper end the stud 89, projecting toward the right, and two trunnion-like pins, 90, projecting forward and backward, are applied to the piston 88. The nuts for the adjusting-screw 91 and the safety-screw 92 are tapped in the stud 89. The adjusting-screw 91 serves for limiting the depth to which the plate $a$ is to be pushed. The two pins 90 are provided for the fork to act upon, in which the right arm of lever 93 terminates. The stand 94 is bolted to the slide 69 and serves as a fulcrum-support for lever 93. At the end of the left arm of lever 93 the roller 95 is attached, which engages the camway 96, Figs. 3 and 38. The camway 96 is pivoted to the arm 97, the latter being bolted to the guide-plate 78 in such a manner that it admits vertical adjustments. The spring on the stationary stem 98 presses the end of the camway 96 upward, and the nut on this stem prevents it from going higher than required.

Now, let us return to the type held in the vise and moving toward the right with the slide 69, and with all parts which are attached to the slide. A little before the type arrives at the point of the knife 99, (see Fig. 12,) which is fastened to the mold, the roller 95 of the left arm of the lever 93 has reached the high part of the camway 96, causing the fork of the right arm of the lever 93, which straddles the piston 88, to press upon the pins 90, and the type to be forced against the top face of the mold. In this state the type passes the knife 99, and becomes shaved at its lower side. In the meantime the type passes also the breaker 100, Fig. 12, and the jet will be removed. After the type is shaved at its lower side, the roller 95 has arrived at the low place at the right of the camway 96, and the pressure will be released, and when the slide 69 reaches the right extremity of its stroke and stops there the type in the vise will be exactly over the perpendicular space between the plates 101 and 102 of the grooving and dressing apparatus, which we will describe hereinafter. Then the rod 103, Figs. 21 and 22, will be set in motion, the screw 104 in the upper horizontally-bent part of this rod 103 will strike the piston 88, and the plate $a$ will push the type into the space between the plates 101 and 102. At the same time, when the slide 69 occupies its extreme right position, the mold is closed, and matrix, body-piece, and choker are moved to the positions occupied when metal is forced into the mold. Soon after the type is pushed out of the vise the pump-plunger forces a new charge of metal into the mold, and the operations described will be repeated. The types pushed one after the other into the space between the plates 101 and 102, Figs. 12 and 16, form a column and pass first the knife 106, to be grooved by the same; then the two knives 107 and 108, Figs. 12 and 15, between which they are dressed; and, finally, they are discharged by the same jerking motion into and through the curved guide b, Figs. 1 and 3, and set on the stick 110, which is placed upon the table 111, supported by the bracket 112.

The bent rod 103, Figs. 21 and 22, is hinged near its upper end to the link 113, and at its lower end to the backwardly-directed arm of the lever 115. The link 113 is pivoted to the stationary post 114, which is screwed tight to the mold-beam 5. The lever 115 has its fulcrum at 116, Fig. 6, in one horizontal line with the fulcrum of the lever of the pump mechanism. Its forward arm is provided with the roller 117, that engages the cam 118, Fig. 21, and to its backwardly-directed arm the guide-rod 119 of the spring 121 is attached. The spring-rod 119 is guided in the center frame, 4, and the collar, with set-screw 120 on the same, serves to regulate the tension of the spring. It is the task of the cam to jerk the rod 103 down and the office of the spring to raise it up.

The motion of the mold-covering slide 69 and the regulation of its stops at the terminations of its stroke are effected by the cam 122, that engages the roller 123, which is attached to the lower arm of the lever 124. The upper arm of the lever 124 is made double, so as to form a fork for the wedge 166 to pass through, and is prepared with bearings to receive the trunnions of the cross-head 126. The axle 125 of the lever 124, Figs. 1 and 3, is journaled in the mold-beam 5.

The arms 127 and 128, arranged at the sides of the mold-beam, the one in the front passing through a hole provided for this purpose in the sole-plate of the mold-beam, are united at their lower ends by the pin 129, which goes also through two links, 130, (only one of which is visible in the drawings,) and through the cross-head 131, the latter being in the center of and fitting between the links 130, which fit between the side arms. The links 130 vibrate on the pin 132, by means of which they are attached to an eye in the center frame. The rod of the spring 133 is screwed tight in the cross-head, is guided in the center frame, 4, and provided at its lower part with screw-threads for the nut 134, which serves to regulate the tension of the spring. To the pin 135, Fig. 8, which also unites the side arms, the connecting-rod 136, Figs. 3 and 7, is pivoted to impart the vibrations of the lever 124 to the side arms. The right end of the connecting-rod 136, which terminates in a screw, passes through a hole in the cross-head 126, Fig. 3, and is secured to the same by two nuts, which also serve for adjusting its length. The pin 137 serves to communicate the motion to the slide 69, and is so arranged that it can be easily removed and put in its place again. After the pin 137 is disengaged the slide 69 is free to be taken out, with all parts attached to the same, which often becomes very desirable in order to clean the bearing-surfaces or to inspect or adjust the various attachments more conveniently.

When the pin 137 is in its working position, the upper smaller half-round surfaces of the holes at the upper ends of the side arms bear upon the bottoms of the grooves, which are turned in the pin 137, (see Figs. 8, 36, and 37,) and the thicker center part of the latter rests upon the semi-cylindrical bearing provided for the same on the slide 69. A part of the head of the pin which is flattened fits in a corresponding hole of the small plate 140, Figs. 34 and 35, that is riveted to one of the side arms, 127, to prevent the pin from turning, and the slide 69 is pressed on its seat by means of the spring 133, Figs. 1 and 3, with a force sufficient to overbalance the tendency of the slide to be lifted by the pressure with which the liquid metal is forced into the mold.

When the pin 137 is to be removed, the side arms are first to be placed in about a vertical position by turning the machine a little, and then lifted so much as to bring the larger lower parts of the holes in their upper eyes concentric with the bearing-place of the pin in the slide 69, or a little higher, Figs. 7, 34, and 35. Then the pin can be pushed down, Fig. 34, and taken out. In order to facilitate the lifting-up manipulation, the lifter 138 and the cam 139 are applied, Figs. 1, 3, 7, and 37$^a$. The lifter is placed under the connecting-rod 136 and attached to the mold-beam by means of a pin. The cam is journaled at each side in the mold-beam, Fig. 37$^a$, and prevented from moving longitudinally, and has in front a head, to which a wrench can be attached to turn it. A quarter-turn of the cam brings its cylindrical part in contact with the lifter and effects the elevation of the side arms. In Fig. 3 cam and lifter are shown in their idle position, while Fig. 7 illustrates the position which they occupy when the side arms are elevated and ready to receive the pin.

The motion of the sliding bar 74, to which the body-piece 68 of the mold is fastened, is produced by the cam 141, Figs. 1, 6, and 23, and the spring 153, Figs. 1 and 3. The cam moves it upward, regulates its downward motion, and determines the duration of its cessations, while the spring causes it to move downward. The cam 141, Figs. 6 and 23, engages the roller 142, which is attached to the obliquely forward-directed arm of the angular lever 143. This lever vibrates on a pin, 144, which is fastened to the center frame, 4. The backwardly-directed arm of the lever 143, Figs. 23, 24, and 25, carries between guides a block, 151, to which the anti-friction roller 145 is attached. The block 151, with the roller, can be moved to and from the fulcrum 144 by means of the adjusting-screw 146, and can be bolted to the lever-arm in any desired position. The roller 145 impinges against the lower side of the arm 147 and transmits the motion to it. Said arm vibrates on the pin 148, and is provided with the pin 149 for the secondary arm 150 to move on, Figs. 23 to 26. The upper face of the arm 150 acts upon the rounded lower end of the sliding bar 74 and imparts the motion to this piece. By means of the set-screw c at the back end of the arm 150 the angle which the upper face of the arm 150 forms with the lower face of the arm 147 can be changed, Fig. 26. By means of the bolt d the two arms 147 and 150 can be firmly united. An alteration of the distance from the fulcrum 144 to the center of the roller 145 effects a change of the length of the stroke of the body-piece of the mold, and a change of the relative position of the two arms 147 and 150 alters the position of the body-piece. Consequently this contrivance furnishes the means for adjusting stroke and position of the body-piece of the mold. It may be seen that the adjustments can be made so that the bearing-places of the different parts of this mechanism keep constantly in contact, and that there is no dead motion of any part. The form of the cam 141 is so determined as to produce simple harmonic motions—i. e., motions the first half of which is accelerated and the second half retarded. By these means a smooth and noiseless working of the mechanism is secured. The spring 153 rests upon the lower guide, 154, Fig. 1, of the rod, by which it is held, and presses this rod upward. The nut on which it acts serves, also, for regulating the pressure of the spring.

The head 155, which is screwed to the upper end of the guide-rod of the spring 153 and secured to the same by a jam-nut, slides in the guide-block 156, Figs. 3 and 4, and terminates at its upper end in a fork that straddles the lever 157, and a pin which is driven through the forked part of the head 155 impinges in a notch at the lower side on the left arm of the lever 157 and imparts the pressure of the spring to the same. The guides 154, Fig. 1, and 156, Figs. 3 and 4, are bolted to the left side frame, 2. The lever 157 is fulcrumed in the upper arm of another lever, 158, which is supported by the pin 159, and which is held firmly stationary by means of the screw 160. The fulcrum-pin 159 is fixed to the center frame, 4, and the screw 160 is journaled in the left side frame, 2, and in the center frame, 4, is provided with collars to prevent it from moving longitudinally, and with a hand-wheel to be turned by, and it engages the swiveling nut 161, affixed to the lower arm of the lever 158. The end of the right arm of the lever 157 passes through the hole 162, Fig. 12, at the lower end of the slide 74, and acts upon the rounded surface at the bottom of this hole, forcing the slide with the body-piece of the mold down.

Sometimes it is desirable to operate the lever 157 by hand in order to investigate whether the slide 74, with the body-piece of the mold, works smoothly and easily, especially in fitting and adjusting the various parts of the mold. To accomplish this the lever 157 must be released from the pressure of the spring, and for this purpose the lever 163, Fig. 4, is provided, which is applied to the left side frame, 2, which vibrates on the bolt 164, and is connected with the head 155 of the spring-rod by the pin e. In order to release the lever 157 from the pressure of the spring the lever 163 is to be pressed down until the hole g in the head of the spring-rod meets the holes f in the guide-block, and then a pin to be put in these holes. After the spring 153 is disengaged the slide 74 may be moved up and down by applying the hand to the left end of the lever 157. The lever 163 may be omitted, as the spring 153 can be also compressed until the hole g in the head 155 of the spring-rod comes opposite the hole f in the guide 157 by pressing directly upon the left end of the lever 157; but in this case the operation requires more force.

In fitting the slide 74 and the mold to a new machine, or when any one of the parts of the mold is to be renewed, the slide 74 is to be taken out several times and replaced and operated by hand again. The slide 69 and the wedges 165 and 166, of which we will speak hereinafter, are not needed in their places on such occasions, and may be taken out. The stationary parts of the mold can easily be screwed off, and sometimes need only be put in their place without tightening; but the lever 157 must be withdrawn in order that the slide 74 can be taken out, and must be put in position again after the slide is replaced in order to move the latter by hand. Screw 160 and lever 158, upon which lever 157 is fulcrumed, serve to facilitate this operation. If after the spring 153 is disengaged the screw 160 is turned in one direction, the lever 157 will move toward the left, and will leave the slide 74, and if the screw is turned in the opposite direction the lever will return to its working position, in which it is drawn.

The wedges 165 and 166 are devised to control and adjust the positions of the body-piece of the mold during its cessations. They are accurately fitted in openings prepared for them in the mold-beam and pass through holes in the slide 74. The wedge 165 determines the upper position of the body-piece, and can be moved to and fro by means of the screw 168, Fig. 5, which is attached to the mold-beam 5 in such a manner as to be incapable of longitudinal motion. It is so adjusted that the top surface of the body-piece will be exactly even with the top faces of the cheeks 64 and 65 of the mold when the slide 74 is elevated as high as the wedge will allow. After being adjusted it is tightened to the mold-beam by means of the screw 167.

The wedge 166, Fig. 3, terminates in a screw, which is parallel to the lower inclined face of the wedge and which fits in the nut 169. This nut is supported by the stand 170, in which it is swiveled, but incapable of longitudinal motion, and carries a hand-wheel, 171. A turning of the nut by the hand-wheel causes a longitudinal sliding of the wedge 166 upon the inclined bearings prepared for the same in the mold-beam and a higher or lower position of the upper horizontal face of the wedge 166. As the spring 153 cannot force the slide 74 with the body-piece of the mold any deeper than the wedge 166 permits, the depth of the mold, equal to the thickness of the types to be cast runningwise, can be regulated by means of this arrangement. To the hand-wheel 171 a ring of angular section, with an index on its cylindrical face, is attached, and a finger, 172, which is fastened to the stand 170, points to the index. At the right side of the hand-wheel 171 an annular dovetail or T groove is turned in to receive the heads of small bolts, by which the index-ring can be tightened to the wheel after the cipher-point of the index has been moved to correspond with the point of the finger 172. The taper of the wedge, the pitch of the screw, and the scale of the index are so selected that an alteration of the depth of the mold, to be effected by turning the hand-wheel 171, may be measured accurately. If, for example, the inclination of the wedge is selected to be "one to six" and the screw is provided with twelve threads to the inch, one revolution of the hand-wheel will effect an alteration of one seventy-second of an inch, the equivalent to a typographical point; and if the circumference of the index-ring is divided into twenty-four equal parts a motion of the hand-wheel 171 from one point of the division of the scale to the other will produce an alteration of one twenty-fourth of a typographical point in the depth of the mold. After the depth of the mold is adjusted the wedge 166 may be secured in its position by means of the bolt 173, Figs. 1, 2, 3, and 23, and a nut tapped in a plate, (see Fig. 23,) which is located behind the wedge and clamps the latter to the front part of the mold-beam 5, when the bolt is tightened.

The matrix-vise, Figs. 1, 2, 6, 10, 11, 46, and 47, consists of a hollow block, 174, on the top of which the plate 175 is screwed, projecting toward the mold and forming the fixed jaw of the vise and of the movable jaw 176, which is placed inside of the block 174, hinged to the latter by means of the pin 177 and provided with a tappet-hole for the thumb-screw 178 to work in. The stool $h$, Fig. 11, which is provided with a small tongue fitting in a groove at the lower side of the plate 175, is fastened to the plate by a countersunk screw and serves as a rest for the head of the matrix 181. The small plate $i$, resting against the block 174, also screwed to the top plate, 175, serves as a support for the back of the matrix to rest against. Between the plate $i$ and the top plate, 175, another plate, $k$, is inserted, which is a little wider than the plate $i$, and which is reduced in thickness, (by filing, say,) so that the distance from the top of the mold to the bottom face of plate $k$ corresponds with the standard to which the side bearings of the matrix are fitted. In a similar way the left face of the stool $h$ is so fitted that the distance of this face from the mold suits the standard head-bearing of the matrix 181. Instead of inserting and fitting the plate $k$, the top plate, 175, may be placed and fitted at such a distance from the mold as to answer the side bearings of the matrix. These fittings have to be made but once, and when a matrix is to be put in the vise it needs only to be pushed close to the stool $h$ and against the back-rest $i$, while the thumb-screw 178 is tightened to close the jaws, and no tedious setting and adjusting is required every time a matrix is to be exchanged.

For casting quads or spaces we use matrices with rectangular elevations, fitting into the mold as deep as necessary to make the quads or spaces so much lower than the type as required. The vise-block is mounted upon the carriage $l$, Figs. 1, 2, and 6, between the sides of which it fits, pivoted on the pin $m$, and is tightened to the carriage $l$ by means of the pin $n$. This pin $n$ may be driven out by a light blow with a hammer, and the vise-block swung up to the position indicated by dotted lines in Fig. 2, for inspection, cleaning, &c. The matrix, however, may be conveniently put in the vise in either position of the same. The carriage $l$ is provided with a dovetail to slide in a corresponding guide, prepared for the purpose on the forward projection of the mold-beam 5.

The motion of the matrix-carriage, Fig. 6, is derived from the cam 185 and the spring 186. The cam 185 withdraws it and the spring 186 causes it to move toward the mold. The cam 185 engages the roller $o$, which is attached to the lower arm of the lever 188 by means of a pin. The rod which holds the spring 186 is applied to the same arm of the lever 188 a little below the roller $o$, and slides in guide 189, which is bolted to the center frame, 4. The lever 188 oscillates on the fulcrum-pin 190, and its upper arm enters a hole in the carriage $l$, prepared for the purpose, operating in the same similar to a tooth of a wheel working in the space between two adjacent teeth of a rack, and imparts its motion to the carriage.

The choker is operated by the cam 191 and by the spring 192, Fig. 17, the former moving it in one direction and the latter in the opposite one. The cam 191 engages the friction-roller 193, which is applied to the obliquely-standing arm of the angular lever 194. The bracket 195, to which the fulcrum-pin of the lever 194 is attached, is bolted to the center frame, 4. The backwardly-directed arm of the lever 194 terminates in a toe, which engages a similar toe of the arm 196. This arm 196 is pivoted at 197 to the bracket 198, which is bolted to the swinging base-plate 6 of the furnace, and is connected with the arm 199 of the choker-shaft $p$ by means of the rod 202. The choker-shaft $p$ moves in the journal-box $q$, which is bolted to the horn or projection 16 of the furnace 10 and projects at either side of this box. To its left projection the arm 199 is fastened, and to its projecting right end the finger $r$ is fixed, which works in a hole in the choker and transmits motion to the same.

The connecting-rod 202 is attached to the arm 196 by means of the pin 201, passes through a hole in the swinging base-plate 6 of the furnace, and through a hole in the cross-head s, and terminates in a screw, to which two nuts are applied for adjusting the length of the rod. (Two nuts are used to lock one by the other.) Between the collar t, which is slipped on the rod and rests against a shoulder, and the cross-head s the spring 207 is inserted. One trunnion of the cross-head s is journaled in the arm 199 itself and the other one in a cap, which is fastened by two screws to the arm 199. The spring 192 rests with its upper end against the swinging plate 6 and with its lower end against the head of the connecting-rod 202. It has the tendency to press the rod 202 down and comes into action and moves the choker 61 forward to close the discharge-opening in the nipple 31, when the concentric part of the cam 191, which has the larger radius, leaves the roller 193, and it keeps the discharge-opening closed as long as that concentric part of cam 191 which is nearer to the shaft is passing the roller 193. Then the cam 191 becomes the acting element and moves the choker back to the position in which it is drawn. The motion of the connecting-rod is a little greater than necessary to move the choker from one seat to the other. After the choker has arrived at its seat in the sleeve 62 and the arm 199 and the cross-head s have come to a stop the spring 207 will be a little compressed and the nuts at the upper end of the rod 202 a little removed from the cross-head s. The object of this arrangement is to facilitate the adjustment of the choker mechanism. When the base-plate 6 is swung away from the mold, the toe of the arm 196, also, is withdrawn from the toe of the lever 194, and the spring 192 closes the discharge-opening in the nipple and forces the arm 196 to its lowest position. The form of the toes is so selected that they will come in proper contact again when the base-plate 6 is moved to its working position. It is not necessary for the operator of the machine to pay any attention to this point.

The grooving and dressing apparatus, Figs. 3, 12, 15, 16, 31, 32, and 33, to which we have referred before, is constructed as follows: The plate 101, which forms with the plate 102 a groove or guide, is fastened rigidly to the mold-beam 5. The plate 102 is provided with two pins or stems, u u, which are guided in the block 211, and is constantly pushed toward the plate 101 by springs operating on the stems u u. The block 211 is provided at its back side with a feather, which fits in a groove in the mold-beam 5 and fastened to the latter by means of the bolt v, Fig. 27. The plate 102 and the thicker part of plate 101 are as wide as the bodies of the types are high, and the top faces of the plates are exactly even with the top face of the mold. To the back of the block 211 a plate is bolted, which is composed of two pieces, 214 and 215, and which serves as a guide for the plate 102 and as a rest for the feet of the types to slide on. In the piece 214 two oblique grooves are planed, one to receive the grooving-knife 106, and one, 206, for the shavings produced by this knife to escape through.

The piece 215 is fastened to the piece 214 by means of countersunk screws, and is provided with the set-screw 227, for holding the grooving-knife 106. (See Figs. 31, 32, and 33.) In order to show the grooving-knife 106 and the groove 206, the middle part of piece 215 is supposed to be broken out in Fig. 16. In the plate of uniform thickness which is formed by the two pieces 214 and 215 are planed two grooves directly over the joint of the two pieces, one in front, reaching from the top of the plate to the grooving-knife to make room for burrs that may be left at the feet of the types in breaking off the jets, and one, 216, at the back, to conduct the shavings which come from the grooving-knife 106. (See Fig. 32.) The plate 215 laps the thicker part of the plate 101 and rests with its left face against the thinner part of the same. The spring-stems u u terminate in screws and are furnished with wing-nuts, by means of which the plate 102 may be withdrawn in order to open the space between the plates 101 and 102 and to admit the first type if the space has been empty before. At the lower end of the plate 101 the dressing-knives 107 and 108 are attached. These knives have inclined edges in opposite directions, and are symmetrically placed opposite each other. The face of the first knife, 107, is fitted accurately in the same plane with the face of the plate 101, and between the two knives the gage-pieces 217 and 218 are inserted, which have precisely the same thickness as the bodies of the types. The shavings from the knife 107 escape to the front through a groove filed in the plate 101, (see Fig. 15,) and the shavings produced by the knife 108 are discharged backward into a little gutter, 220, which is held by the same screws with which the dressing-knives 107 and 108 are secured to the plate 101. The lower ends of the plates 102, 214, and 215 are cut off obliquely to suit the inclination of the dressing-knives 107 and 108, and they reach as close as possible to the edges of these knives without touching them. The plate 219 fills out the space between gage-piece 218 and the plate 101. At the upper part of the plate 101 a projection or projections (in the drawings are shown two) are provided to correspond with the nicks in the types, the object of which is to keep the feet of the type resting against the plates 214 and 215, and not to allow them to move forward while they are passing the grooving-knife. For the same purpose plates 221 and 222 and the roller w are applied. The plates 221 and 222 are screwed to the plates 101 and 102, respectively, and project a little over the top surfaces of the bodies of the types and allow the faces or characters of the same to pass between them.

Experience has taught us that if the types in the upper part of the space are held in proper position those below will have no tendency to leave their range. The friction between the types is so great that it takes considerable force to displace one. When the character on the types occupies the whole face, the plates 221 and 222 cannot be used, and must be taken off; but they are of great service when the character is a small one—for instance, a period or a colon. The roller $w$ is made of hard wood, hard rubber, or of similar material, and is placed with its center opposite to the edge of the grooving-knife on a pin projecting at the left side of the lever $x$, which is hinged to the piece 223, that is screwed to the block 211. A spring applied to the eyebolt $y$ presses the roller against the face of the type. The eyebolt $y$ is hinged to the fork $z$, which is fastened to the block 211, passes through a hole near the upper end of the lever $x$, and terminates in a screw furnished with a wing-nut, by means of which the pressure of the spring may be regulated. As the types are jerked down in the space between the plates 101 and 102 and as they pass the grooving-knife 106 the roller $w$ rotates, so that there is a rolling contact between the faces of the types and the face of the roller, which does not injure the faces of the types. These three means for preventing the types from moving away from the grooving-knife and for securing a uniform depth of the grooves we use either in combination or separately, according to circumstances. In the first machine we built we had applied only the roller $w$, and with the best results, until we came to type having very small characters on them, which impressed too deeply upon the roller when we applied the plates 221 and 222.

The pipes $j j j j$, Figs. 1 and 3, are inserted in the mold-beam 5 and in the mold-covering slide 69, and communicate with holes or channels prepared in these pieces for water to circulate in them, to keep the pieces named and the grooving and dressing apparatus at a certain temperature. The pipes $j j j j$ may be connected in various ways with each other, with a water-supply pipe, and a waste pipe by means of india-rubber hose.

The shaft 200, to which the cams for the various motions are attached, is furnished with the fly-wheel 225, the cone-pulley 209, and the handle 210, and may be turned by hand or driven by a belt passing around one of the steps of the cone-pulley 209. The cone-pulley turns loose on the shaft when the machine stands still or when it is turned by hand, and it can be coupled to the shaft when the machine is to be driven by the belt.

The table 224, which slides in V-grooves planed in the side frames, 2 and 3, protects the shaft with the cams, and all the machine parts below the table from shavings, dirt, &c., and serves as a convenient place for the operator of the machine to put his tools on. It may be easily removed, so that all parts located below become accessible.

Having thus described our invention, we claim as new and desire to secure by Letters Patent—

1. The combination, with a horizontally-adjustable base-plate, 6, supporting the furnace 10 and the melting-pot 11 in a type-casting machine, of the pin 9, the pin 32, the adjusting-screw 30, journaled in the said base-plate and having parts, substantially as described, preventing endwise motion, and the sliding block 29, having a vertical hole to fit the upper thicker part of the pin 9, and having a tapped horizontal hole to engage the adjusting-screw 30, substantially as described and illustrated, and for the purpose specified.

2. In a type-casting machine, the combination of a furnace, 10, a combined melting-pot and pump, 11 12, having a discharging-nipple, 31, and a base-plate, 6, for said parts, with the wedge 41, inserted between the said base-plate and the furnace for adjusting the position of the nipple-hole vertically, substantially as described and specified.

3. In a type-casting machine, the combination of a furnace, 10, a melting-pot, 11, having a discharging-nipple, 31, a supporting base-plate, 6, for said parts, and a wedge, 41, inserted between said base-plate and furnace, with the adjusting-screw 44 for moving the wedge minute amounts, so as to adjust the position of the discharge-opening of the nipple vertically very accurately, substantially as set forth.

4. The metal kettle 11, in a type-casting machine, constructed with circularly-arranged flues or openings 59, through which the flame passes vertically, substantially as shown and described.

5. The bracket 54, to which the gas-burner 53 is attached, in a type-casting machine, having a tail projecting to the outside of the furnace 10, in combination with suitable guide-bearings belonging to the supporting parts of the furnace, and a bracket-handle, 226, outside of the furnace, substantially as set forth.

6. In a type-casting machine, a melting-kettle, 11, a metal-pump, 12, a discharging-nipple, 31, an apron, 45, located in front of the nipple, and a choker, 61, having a cylindrical termination adapted to work in a corresponding opening in the said nipple and in the said apron, in combination with a type-mold and a type-discharging body-piece, 68, of the mold, said body-piece sliding in a groove between the stationary mold parts 64, 65, 66, and 67, and perpendicularly to the longitudinal axis of said choker termination, and having its end surface which comes in contact with the type equal to the corresponding surface of the type body-wise and its jet, substantially as described, and for the purpose set forth.

7. In the mechanism for operating the choker 61 of a type-casting machine, in which the furnace, the metal-pot, and the pump are supported by a movable base-plate, the combination, with the lever 194, carried by the stationary framing of the machine, operated by a suitable cam, 191, and having a toe-like bearing-surface at the free extremity of one of its arms, and the arm 196, pivoted to a bracket, 198, projecting from the movable base-plate 6, and having a corresponding bearing-surface at its free extremity for the bearing-surface of the lever 194 to act upon, and for adapting it to automatically engage with and disengage from the lever 194 when the base-plate 6 is moved toward and from the stationary parts of the machine, of the choker 61, the two lever-arms r and 199, rigidly connected with the pivot p, the link 202, connecting the arm 199 with the arm 196, and the spring 192, for maintaining the arm 196 in engagement with the lever 194, substantially as set forth.

8. In a type-casting machine, the rod 20 of the pump mechanism, having a slot and guiding-rollers 23 and 24, in combination with the backwardly-extending curved arm 25 of the lever 25 26, and the guide 22, attached to the base-plate 6, the rod 20 being guided by the guide 22 and operated by means of the curved arm 25 and the rollers 23 and 24, and the lever-arm 25 being adapted to engage and disengage from the said rollers, substantially as set forth.

9. In a type-mold, interchangeable parts, each consisting of the combination of an integral base-plate, 63, made of a solid block, and the permanently-attached cheeks 64 and 65, between which the type is cast, the cheeks being fitted and adjusted but once for the corresponding size of the types, and the base-plate having a rectangular hole for the body-piece 68 of the mold to pass through, and holes for screws for fastening it to the frame of the machine, and the entire plain bottom surface of the base-plate 63, serving as a bearing, and being fitted to a corresponding plain bearing-surface of the framing of the machine, whereby the combined interchangeable parts may be immediately brought into working position, substantially as set forth.

10. In a type-casting machine, the body-piece 68 of the mold, having a simple prismatic outline, and having the support 73 under the wedge-shaped part 72, which fits between the jet-pieces 66 and 67, the said support 73 being made thinner than the part 72, so that the latter may be readily fitted to accurately work between the jet-pieces 66 and 67, substantially as shown and described, and for the purpose specified.

11. In a type-casting machine, the slide 74, to which the body-piece 68 of the mold is attached, having a simple prismatic outline, being provided with openings for the wedges 165 and 166 to pass through, and being guided by a groove planed in the stationary framing of the machine and by a cover which closes this groove, in combination with the body-piece 68 and the wedges 165 and 166, substantially as set forth.

12. In a type-casting machine, the prismatic sliding bar 74, to which the body-piece 68 of the mold is attached, and which has a slot for the wedge 166, in combination with the framing having a groove in which the bar 74 slides, and the wedge 166, passing transversely through the slot of the sliding bar 74, the wedge 166, having suitable bearings in the framing and serving as a stop for the downward motion of the sliding bar 74 and limiting the depth of the mold, substantially as described.

13. In a type-casting machine, the sliding bar 74, to which the body-piece 68 of the mold is attached, in combination with the framing having a groove in which the bar 74 slides, and the wedge 165, the sliding bar 74, having a slot for the wedge 165 to pass through transversely, and the wedge 165, having suitable bearings in the framing and serving as a stop for the upward motion of the sliding bar and the body-piece of the mold, substantially as described.

14. In a type-casting machine, the sliding bar 74, to which the body-piece 68 of the mold is attached, in combination with the framing, a wedge, a screw, and a nut, the framing having a groove in which the bar 74 slides and suitable bearings for the wedge, the wedge passing transversely through a slot in the sliding bar 74 and being adapted for limiting the movement of the bar 74, and the said screw and nut being arranged and adapted for adjusting the position of the wedge in order to adjust thereby the limit of the movement of the bar 74, substantially as set forth.

15. In a type-casting machine, the combination, with the sliding bar 74, to which the body-piece 68 of the mold is attached, of the arms 147 and 150, the screw c, adapted to adjust the relative positions of these arms, and the bolt d, for uniting the same, the lever 143, the adjustable roller 145, the sliding block 151, to which the roller 145 is pivoted, the adjusting-screw 146, and the cam 141, the lever 143 being pivoted to the frame, one of its arms being provided with a friction-roller, 142, for the cam 141 to operate on, and its other arm having suitable bearings for the block 151 to slide in, the screw 146 being arranged and adapted to adjust the block 151 and the roller 145 lengthwise of said arm, thus providing a variable leverage of the same, the arms 147 and 150 being placed adjacent to each other and approximately parallel to the arm of the lever 143, which carries the roller 145, and adapted to form united one double arm of adjustable width vibrating on the pivot 148, the roller 145, engaging the lower edge of the arm 147, and the upper edge of arm 150, engaging the lower end of the sliding bar 74 and transmitting the motion to the same, substantially as set forth.

16. The device for disengaging the lever 157 from the slide 74, to which the body-piece 68 of the mold is attached, comprising the combination of the slide 74 with the lever 157, the lever 158, the swiveling nut 161, and the screw 160, the lever 157 having its fulcrum upon the lever 158 and acting directly upon the slide 74, substantially as shown and described.

17. The device for releasing the lever 157 from the pressure of the spring 153, comprising the combination of the lever 163, the spring 153, the guide-rod of the spring 153, and the guide 156, the head 155 of the said guide-rod having the hole $g$, and the guide 156 having the hole $f$, substantially as set forth.

18. The combination, in a type-casting machine, of the mold-covering slide 69, with the two side arms, 127 and 128, the links 130, the cross-head 131, the spring 133, the guide-rod of this spring, and the nut 134, substantially as and for the purpose set forth.

19. In a type-casting machine, the combination of the mold-covering slide 69, the side levers, 127 and 128, and the pins 137 and 135, with the lifter 138 and the cam 139, for elevating the side levers when the slide 69 is to be removed, substantially as shown and described.

20. The matrix-holding vise constructed with the block 174, the stationary jaw 175, the screw 178, the movable jaw 176, the stool $h$, the back-rest $i$, and the plate $k$, the block 174 being fastened to a slide, $l$, substantially as shown and described.

21. In the mechanism for moving the matrix-holding vise to and from the mold, the carriage $l$, to which the matrix-vise is attached, having side flanges for the vise-block 174 to fit between, and a bearing-surface for the vise-block 174 to rest upon with its bottom face, and having tooth-like bearing-surfaces for the end of the upper arm of the lever 188 to work between, and being suitably guided in the framing of the machine, in combination with the operating-lever 188, having bearing-surfaces corresponding with the said tooth-like bearing-surfaces of the carriage $l$, and suitable mechanism, as described, to operate the lever 188, substantially as described and specified.

22. The combination, with the slide $l$, having apertured side flanges, of the matrix-holding vise having a transverse aperture and being pivoted to the slide, and the pin $n$, substantially as and for the purpose specified.

23. In a type casting and finishing machine, the mechanism for pushing the types through the grooving and dressing apparatus, consisting of the pusher $a$, the hollow piston 88, a lifting-spring in this piston, the pushing-screw 104, the bent rod 103, the link 113, pivoted to a stationary support and jointed to the bent rod 103, the lever 115, pivoted to the framing and connected with the bent rod 103 and operated by a suitable cam, the rod 119, jointed to the lever 115 at one end and guided at its other end in the frame, and the spring 121, guided by the rod 119, substantially as set forth.

24. The type grooving and dressing apparatus constructed with the stationary plate 101, the spring-pressed plate 102, suitable springs arranged to press the plate 102 toward the plate 101, the stationary dressing-knives 107 and 108, and the gage-pieces 217 and 218, the said dressing-knives having oblique cutting-edges and being placed diametrically opposite each other, having their inner and opposite plain faces parallel to the plate 101, and having their cutting-edges symmetrically inclined in opposite directions, the space between the stationary plate 101 and the spring-pressed plate 102 and in rear of the dressing-knives being regulated by the thickness of the undressed types, and the distance between the inner and opposite plain faces of the dressing-knives being made equal to the thickness which the finished types are required to have, and this distance being constantly preserved by the gage-pieces 217 and 218, interposed between the dressing-knives, substantially as set forth.

25. In a type-grooving apparatus, the stationary plate 101, the opposing plate 102, and the smaller plates, 221 and 222, in combination with a stationary knife, 106, for planing grooves in the feet of types, the plate 102 being provided with studs $u\ u$ for supporting it parallel to the plate 101, and the plate 102 being provided with springs for pressing it toward the plate 101, the two plates 101 and 102 forming a self-adjusting guiding-channel into which the types are pushed and guided to the grooving-knife, the small plates 221 and 222 being attached by means of screws to the outer sides of the plates 101 and 102 at the ends where the types enter the guiding-channel and at the side where the faces of the types will be, and the small plates 221 and 222 projecting a little over the space between the plates 101 and 102, the plate 101 having at the end where the types enter the channel guiding projections corresponding in number and form to the nicks in the types, and one part of the face of plate 101 ahead of the small plate 221 being left smooth and without projections, so that types may be taken out endwise for inspection after they are grooved and before they are delivered to the dressing-knives, substantially as set forth.

26. In a type-grooving apparatus, the plate 101 and the opposing plate 102, having springs, as described, in combination with the block 211, the roller $w$, and the pin on which the same rotates, the swinging arm $x$, to which the pin of the roller $w$ is attached, the eyebolt $y$, and the spring on this eyebolt, substantially as shown and described, and for the purpose specified.

27. The plates 102, 214, and 215 and the grooving-knife 106, in combination with the block 211, to which these pieces are applied, substantially as described, and for the purpose that these parts of the apparatus may together be detached from the machine, and that the knife may be set conveniently to cut grooves of the required depth.

28. The type-dressing knives 107 and 108 and the gage-pieces 217 and 218, in combination with the plate 101, the dressing-knives having the form of plates with oblique cutting-edges and being fastened to the plate 101 near one end of the same and arranged symmetrically and diametrically opposite each other, with their oblique cutting-edges inclining in opposite directions and their inner opposing faces being parallel to the face of the plate 101, and the gage-pieces 217 and 218 being as thick as the finished types and being clamped between the dressing-knives, substantially as herein shown and described, and for the purpose that these parts may be fitted together and adjusted or conveniently inspected and then attached to the machine.

HENRY BARTH.
ERNST LIETZE.

Witnesses:
JOHN MCGHEE,
C. R. NEVIN.